United States Patent
Lo et al.

(10) Patent No.: US 7,485,203 B2
(45) Date of Patent: Feb. 3, 2009

(54) ASSEMBLY METHOD FOR DISPLAY PANEL

(75) Inventors: Yu-Cheng Lo, Sindian (TW); Sheng-Fa Liu, Jhudong Township, Hsinchu County (TW); Huai-An Li, Jhongli (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 371 days.

(21) Appl. No.: 11/361,538

(22) Filed: Feb. 24, 2006

(65) Prior Publication Data

US 2007/0199650 A1  Aug. 30, 2007

(51) Int. Cl.
B32B 37/00 (2006.01)
(52) U.S. Cl. .......... 156/285; 156/99; 156/104; 156/67; 156/382; 156/103; 156/286
(58) Field of Classification Search ........ 156/285, 156/104, 67, 99, 382, 103, 286
See application file for complete search history.

(56) References Cited

U.S. PATENT DOCUMENTS 6,290,793 B1   9/2001  Lovas et al. .............. 156/99
6,304,311 B1  10/2001  Egami et al. ............. 348/189
2002/0008838 A1  1/2002  Matsuda ................... 349/187
2004/0089397 A1*  5/2004  Cheng et al. ............. 156/67
2004/0089414 A1*  5/2004  Makino et al. ........... 156/285

FOREIGN PATENT DOCUMENTS

JP      2000-066163     3/2000

* cited by examiner

Primary Examiner—Jeff Aftergut
Assistant Examiner—Jaeyun Lee
(74) Attorney, Agent, or Firm—J.C. Patents

(57) ABSTRACT

An assembly method for display panel comprises the following steps. First, a first substrate and a second substrate are placed inside a chamber, wherein the first substrate comprises a sealant disposed thereon, and the chamber has a first pressure. Next, the pressure inside the chamber is adjusted to a second pressure, which is lower than the first pressure. After that, the first substrate is aligned with the second substrate, and the second substrate is placed on the sealant, to form a closed space between the first substrate and the second substrate. The pressure inside the closed space is the second pressure. Thereafter, the chamber is pumped from the second pressure to a third pressure, to bond the first substrate and the second substrate together by the pressure difference between the third pressure of the chamber and the second pressure of the closed space. Finally, the sealant is cured.

13 Claims, 6 Drawing Sheets

ASSEMBLY METHOD FOR DISPLAY PANEL

BACKGROUND OF THE INVENTION

1. Field of the Invention

The present invention generally relates to a display panel, in particular, to an assembly method for display panel.

2. Description of Related Art

Liquid crystal on silicon panel (LCOS panel) is a liquid crystal display panel based on the silicon wafer backpanel. The LCOS panel using the silicon wafer as the backpanel utilizes the MOS transistor to replace the thin film transistor of conventional LCD device. The pixel electrode thereof mainly comprises metal material, and therefore the LCOS panel is a reflective liquid crystal panel. Because the metal pixel electrode of the LCOS panel completely covers a pixel region, especially the MOS transistor, therefore the image display quality of the LCOS panel is better than that of the conventional LCD device. Besides, the LCOS panel is based on the silicon wafer backpanel and has the advantages of compact volume and higher resolution. Therefore, the LCOS panel is broadly used in the liquid crystal projector, and it can meet the requirement of reduced volume.

FIG. 1 is a schematic cross-sectional view showing a conventional LCOS panel when assembling. Please refer to FIG. 1, when forming the LCOS panel, a silicon wafer backpanel and a glass substrate are assembled together, and then a cutting process is performed to form a plurality of LCOS panels. The structure of each LCOS panel is the same; therefore, only one LCOS panel is illustrated in the following for convenience.

A lower substrate 110 of the LCOS panel is a silicon substrate and an upper substrate 120 thereof is a glass substrate. When assembling the substrates, a sealant 130 is applied to the lower substrate 110. The material of the sealant 130 can be a UV curing resin for example. After that, the upper substrate 120 is aligned with the lower substrate 110, and then the two substrates are bonded together by a machine 30 under the atmosphere. Next, the sealant 130 is exposed to UV light in order to cure the sealant 130.

Generally speaking, the cell gap between the upper and lower substrates of the display panel is maintained by spacers, therefore, the amount and distribution of the spacers inside the display panel are related to the uniformity of the cell gap. However, the spacers are distributed inside the sealant 130. When the upper substrate 120 and the lower substrate 110 are bonded together by the machine 30, the stress is different between the region where the sealant 130 contacts with the two substrates, and other region where the sealant 130 doesn't contact with the two substrates. During the bonding process, the upper substrate 120 and the lower substrate 110 would be bended due to uneven stress. Therefore, the cell gap between the upper substrate 120 and the lower substrate 110 is not uniform, and Newton's ring would occur during display. This would affect the display quality of the LCOS panel severely.

Besides, the height of the spacer is about 2-3 μm in the LCOS panel. However, small particles having a diameter more than 3 μm would be easily generated under the atmosphere, therefore, the upper substrate 120 is not well bonded with the lower substrate 110. The phenomenon of Newton's ring becomes more severe.

FIGS. 2A and 2B are schematic views showing two kinds of protection resin coated on the silicon wafer backpanel. First, please refer to FIG. 2A, a wet process is performed when cutting the silicon wafer backpanel 50 and the glass substrate. In order to protect the silicon wafer backpanel 50 from being polluted by the liquid, a protection sealant 80 is coated on the silicon wafer backpanel 50 before it is assembled with the glass substrate. However, because the protection resin 80 is a protection frame of closed type, the air between the silicon wafer backpanel 50 and the glass substrate can not be removed, and therefore the desired cell gap can not be formed during the bonding process.

Please refer to FIG. 2B, a protection sealant 80 having a plurality of openings 82 is coated on the silicon wafer backpanel 50, and the openings 82 are sealed after the bonding process, in order to remove the air between the silicon wafer backpanel 50 and the glass substrate. However, this method requires an additional process of sealing the openings. Therefore, the fabrication time and cost are increased.

SUMMARY OF THE INVENTION

Accordingly, the present invention is directed to an assembly method for display panel, to prevent the occurrence of Newton's ring effect.

As embodied and broadly described herein, the present invention provides an assembly method for display panel. The method mainly comprises the following steps. First, a first substrate and a second substrate are placed inside a chamber. The first substrate comprises a sealant disposed thereon, and the chamber has a first pressure. Next, the pressure inside the chamber is adjusted to a second pressure, which is lower than the first pressure. Thereafter, the first substrate is aligned with the second substrate, and the second substrate is placed on the sealant, to form a closed space between the first substrate and the second substrate. The closed space has the second pressure. After that, the chamber is pumped from the second pressure to a third pressure, to bond the first substrate and the second substrate together by the pressure difference between the third pressure of the chamber and the second pressure of the closed space. Finally, the sealant is cured.

According to an embodiment of the present invention, before the pressure inside the chamber is adjusted to the second pressure, the method further comprises a step of adjusting the pressure inside the chamber to a fourth pressure, which is lower than the second pressure.

According to an embodiment of the present invention, the fourth pressure is smaller than 30 Pa.

According to an embodiment of the present invention, after the pressure inside the chamber is adjusted to the second pressure, the method further comprises a step of waiting until the pressure inside the chamber is stable.

According to an embodiment of the present invention, the first pressure is about one atmospheric pressure.

According to an embodiment of the present invention, the second pressure is between 20 kPa and 50 kPa.

According to an embodiment of the present invention, the second pressure is between ¼ atmospheric pressure and ⅓ atmospheric pressure.

According to an embodiment of the present invention, the third pressure is larger than the first pressure.

According to an embodiment of the present invention, the third pressure is smaller than the first pressure.

According to an embodiment of the present invention, the third pressure is equal to the first pressure.

According to an embodiment of the present invention, the material of the sealant comprises an UV light setting resin, and the sealant is cured when exposed to UV light.

According to an embodiment of the present invention, the material of the sealant comprises a thermosetting resin, and the sealant is cured when heated.

According to an embodiment of the present invention, the first substrate comprises a silicon substrate and the second substrate comprises a glass substrate.

According to an embodiment of the present invention, the first substrate comprises a glass substrate and the second substrate comprises a silicon substrate.

In the present invention, the first substrate and the second substrate are bonded together by controlling the pressure difference between the pressure inside the closed space and the third pressure, to prevent the first and the second substrate from being warped during assembling. Therefore, the Newton's ring occurred on the display panel can be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
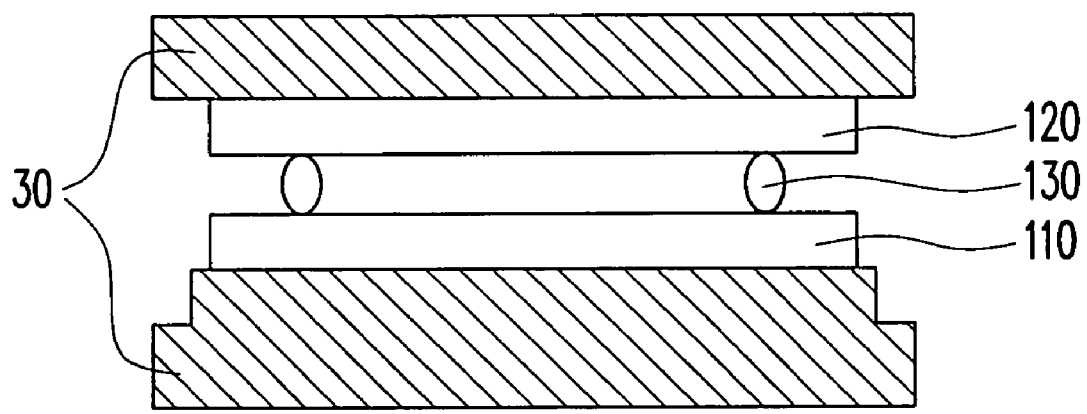
FIG. 1 is a schematic cross-sectional view showing a conventional LCOS panel when assembling.

Reference will now be made in detail to the present preferred embodiments of the invention, examples of which are illustrated in the accompanying drawings. Wherever possible, the same reference numbers are used in the drawings and the description to refer to the same or like parts.

The LCOS panel is taken as an example for illustrating the assembly method for display panel of the present invention in the following. However, this assembly method is not only limited to the LCOS panel. Besides, when fabricating the LCOS panel, the silicon wafer backpanel is assembled with the glass substrate first, and then a cutting process is performed to form a plurality of LCOS panels. Each LCOS panel has the same structure, and therefore a single LCOS panel is taken as an example in the following descriptions for illustration.

First Embodiment

Figure 3:
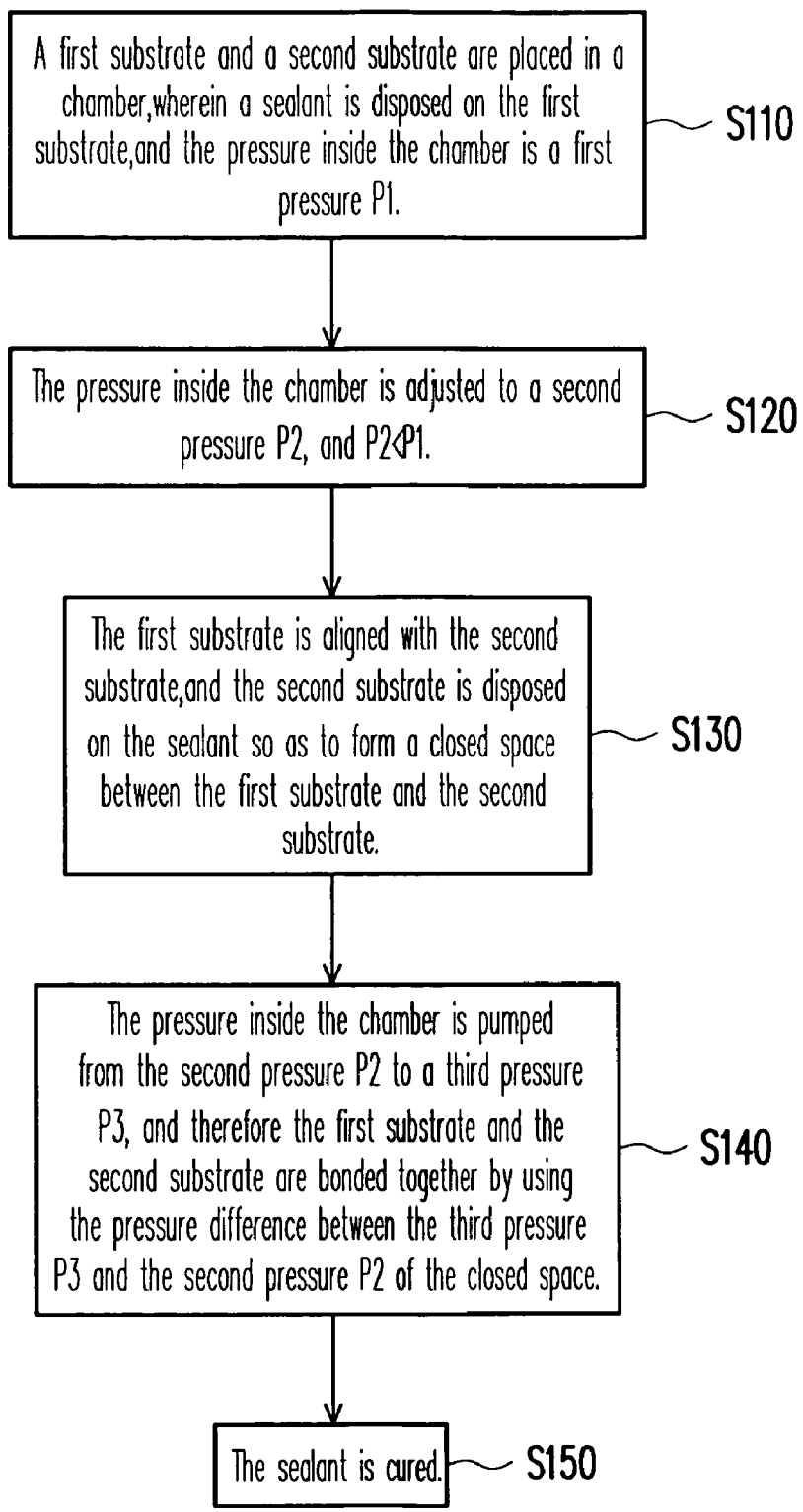
FIG. 3 is a flow chart showing an assembly method according to a first embodiment of the present invention.
Figure 4A:
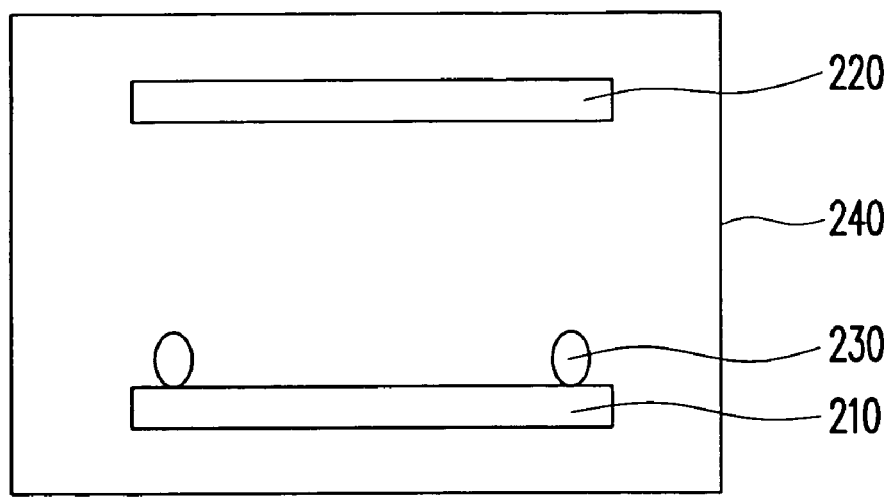
FIGS. 4A to 4C are schematic, cross-sectional diagrams illustrating the assembly method for display panel.
Figure 4B:
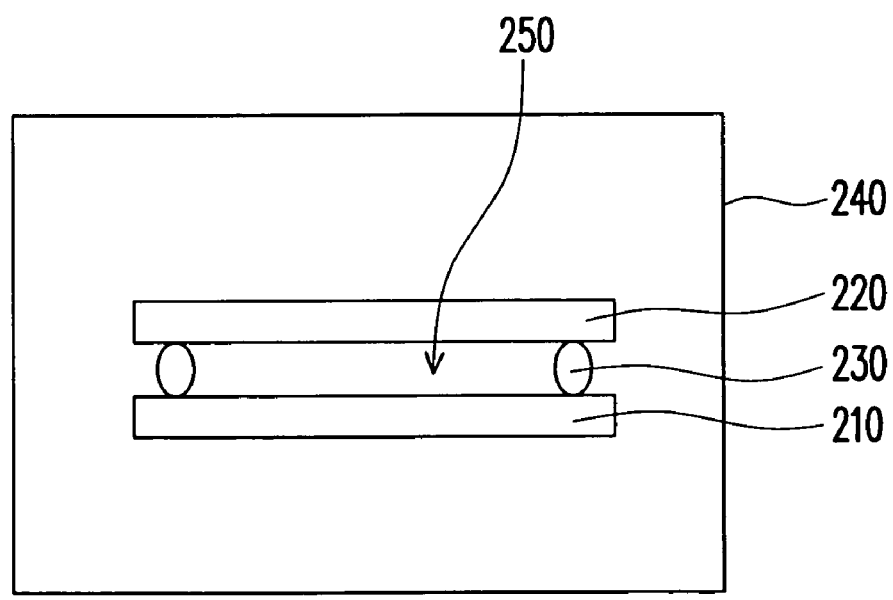
Figure 4C:
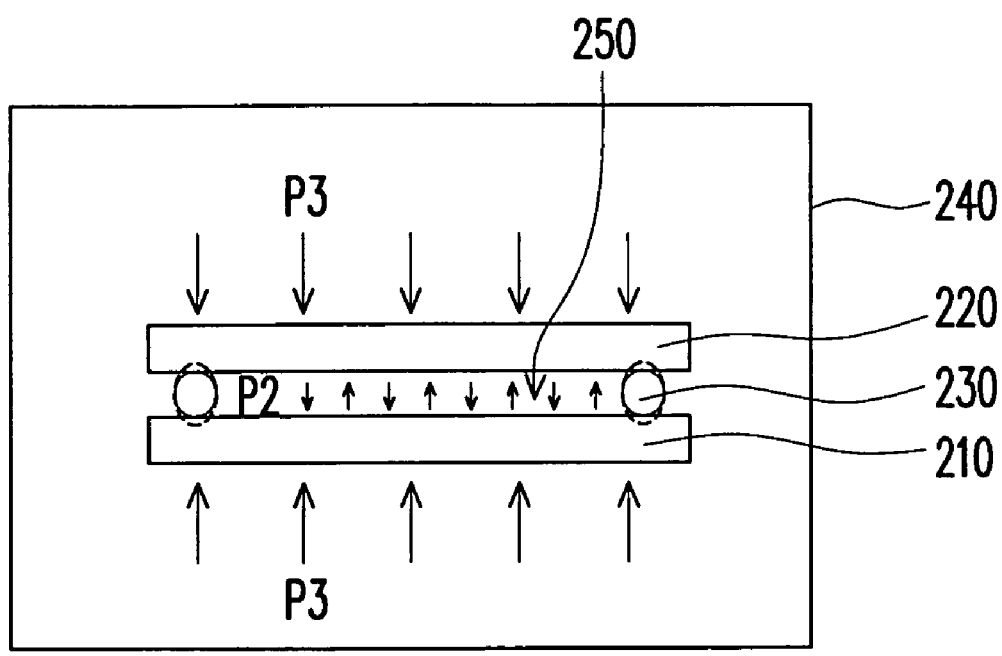

FIG. 3 is a flow chart showing an assembly method according to a first embodiment of the present invention. FIGS. 4A to 4C are schematic, cross-sectional diagrams illustrating the assembly method for display panel. Please refer to FIG. 3, the assembly method for display panel according to this embodiment mainly comprises the following steps:

First, as shown in step S110 and FIG. 4A, a first substrate 210 and a second substrate 220 are placed in a chamber 240. A sealant 230 is disposed on the first substrate 210, and the pressure inside the chamber 240 is a first pressure P1. The first pressure P1 is one atmospheric pressure for example. Besides, the first substrate 210 is a silicon substrate and the second substrate 220 is a glass substrate for example. A transparent electrode layer is disposed on the glass substrate for example, and the material of the transparent electrode layer comprises indium tin oxide (ITO), indium zinc oxide (IZO) or the like. It should be noted that the first substrate 210 and the second substrate 220 can also be a glass substrate and a silicon substrate respectively.

Next, as shown in step S120, the pressure inside the chamber 240 is adjusted to a second pressure P2, which is lower than the first pressure P1. In this embodiment, the second pressure P2 is between 20 kPa and 50 kPa, and it is preferred that the second pressure P2 is between ¼ atmospheric pressure and ⅓ atmospheric pressure. Besides, after the pressure inside the chamber is adjusted to the second pressure P2, the next steps can be performed after waiting until the pressure inside the chamber 240 is stable.

Thereafter, as shown in step S130 and FIG. 4B, the first substrate 210 is aligned with the second substrate 220, and the second substrate 220 is disposed on the sealant 230 so as to form a closed space 250 between the first substrate 210 and the second substrate 220. At this time, the pressure inside the closed space 250 and the chamber 240 are both equal to the second pressure P2. In this embodiment, the first substrate 210 is aligned with the second substrate 220 by a machine, and the machine places the second substrate 220 on the sealant 230. However, the process for bonding the first substrate 210 and the second substrate 220 together is not performed by the machine.

Next, as shown in step S140 and FIG. 4C, the pressure inside the chamber 240 is pumped from the second pressure P2 to a third pressure P3. At this time, the pressure inside the closed space 250 is different from that inside the chamber 240, and the third pressure P3 inside the chamber 240 is larger than the second pressure P2 inside the closed space 250. Therefore, the first substrate 210 and the second substrate 220 can be bonded together by the pressure difference $P_d$ between the third pressure P3 and the second pressure P2.

Thereafter, as shown in S150, the sealant 230 is cured. The method for curing the sealant 230 depends on the material of the sealant 230. More specifically, if the sealant 230 comprises an UV light setting resin, it is cured when exposed to UV light. On the other hand, if the sealant 230 comprises a thermosetting resin, it is cured when heated.

The present invention utilizes the pressure difference $P_d$ between the third pressure P3 inside the chamber 240 and the second pressure P2 inside the closed space 250 to bond the first substrate 210 and the second substrate 220 together. Therefore, the assembly condition is related to the pressure difference $P_d$. In other words, the first substrate 210 and the second substrate 220 would not be warped during bonding if the pressure difference $P_d$ is well controlled. Thus, the Newton's ring occurred on the LCOS panel during display would be improved, and the display quality of the LCOS panel can be enhanced, too.

In the first embodiment of the present invention, the third pressure P3 is equal to the first pressure P1. It means that the third pressure P3 is equal to one atmospheric pressure for example. The second pressure is between 20 kPa and 50 kPa for example, and it is better between ¼ atmospheric pressure and ⅓ atmospheric pressure, to reduce the curvature of the first substrate 210 and the second substrate 220 during bonding. Thus, the Newton's ring occurred on the LCOS panel during display would be improved, and the display quality of the LCOS panel can be enhanced, too.

It should be noted that the pressure difference $P_d$ between the third pressure P3 and the second pressure P2 can be adjusted according to different conditions (such as the size of the LCOS panel). The second pressure P2 or the third pressure P3 can be adjusted to change the pressure difference $P_d$. It means that the third pressure P3 can be less or larger than the first pressure P1 except equal to the first pressure P1.

Figure 2A:
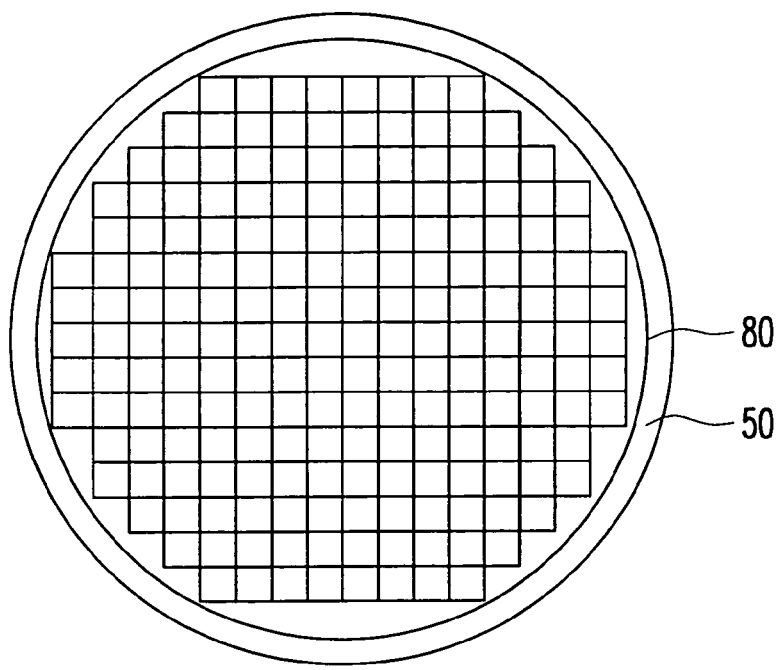
FIGS. 2A and 2B are schematic views showing two kinds of protection resin coated on the silicon wafer backpanel.
Figure 2B:
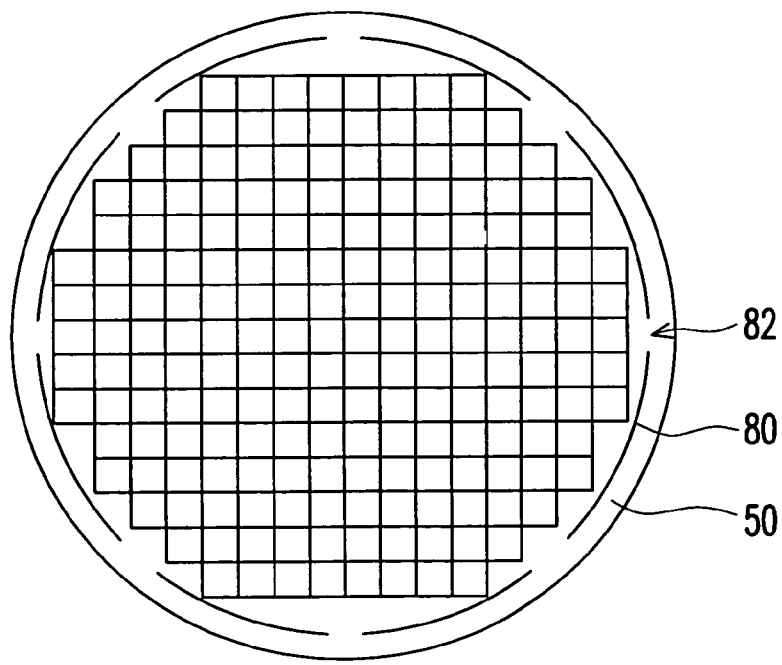

Besides, for the assembly of the silicon wafer backpanel and the glass substrate, the problem that the desired cell gap between the silicon wafer backpanel and the glass substrate can not be achieved due to the air inside the protection sealant 80 (as shown in FIG. 2A) disposed on the silicon wafer backpanel can be resolved by using the assembly method for display panel of the present invention.

Second Embodiment

Figure 5:
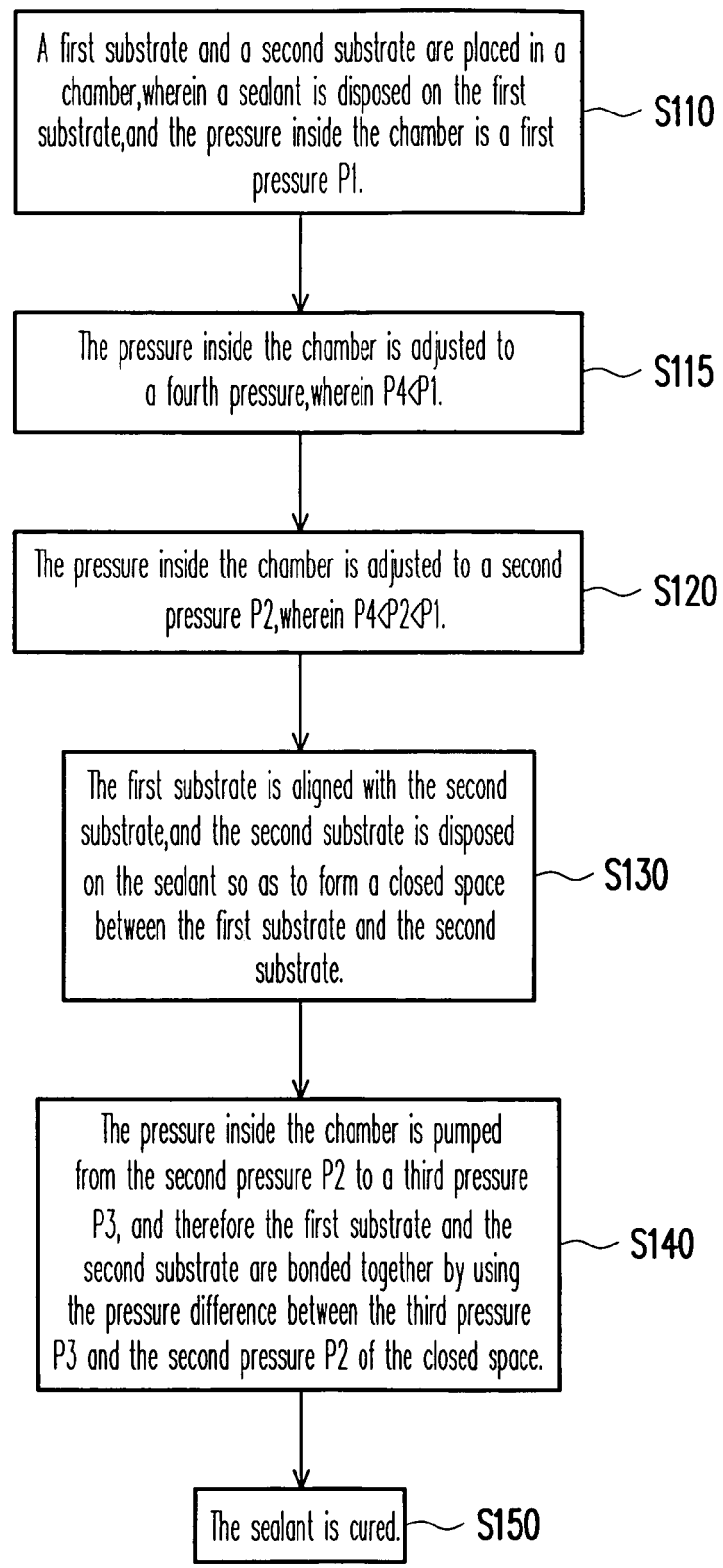
FIG. 5 is a flow chart showing an assembly method according to a second embodiment of the present invention.

FIG. 5 is a flow chart showing an assembly method according to a second embodiment of the present invention. Please refer to FIG. 5, the assembly method of the second embodiment is similar to that of the first embodiment, and the difference between them is that after the step 110 is completed, a step S115 is performed in advance and then the step S120 is subsequently performed in the second embodiment. In the step S115, the pressure inside the chamber 240 is adjusted to a fourth pressure P4, which is lower than the second pressure P2. Practically, a vacuum is created inside the chamber 240, to minimize the number of particles inside the chamber 240. Therefore, the display quality of the LCOS panel would not be affected due to the existence of the particles. The fourth pressure P4 is a pressure under a vacuum state and smaller than 30 Pa. Besides, after the pressure inside the chamber 240 is adjusted to the fourth pressure P4, the next steps can be performed after waiting until the pressure inside the chamber 240 is stable.

In the second embodiment, the step S120 follows the step S115 without performing the step S130 directly, to avoid the first substrate 210 and the second substrate 220 from being warped severely due to the extremely large pressure difference $P_d$ between the fourth pressure P4 and the third pressure P3.

In summary, the assembly method for display panel of the present invention has the following advantages:

1. The present invention utilizes the pressure difference between the third pressure inside the chamber and the second pressure inside the closed space to bond the first substrate and the second substrate together. The first substrate and the second substrate would not be warped during bonding if the pressure difference is well controlled. Thus, the Newton's ring occurred on the LCOS panel during display would be improved, and the display quality of the LCOS panel can be enhanced, too.
2. The air inside the chamber is drawn out to vacuum, to minimize the particles inside the chamber. Thus, the influence of the particles on display quality of the display panel can be reduced.
3. The problem that the desired cell gap between the silicon wafer backpanel and the glass substrate can not be achieved due to the air inside the protection sealant disposed on the silicon wafer backpanel can be resolved by using the assembly method for display panel of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An assembly method for display panel, comprising:
   placing a first substrate and a second substrate inside a chamber, wherein the first substrate comprises a sealant disposed thereon, and the chamber has a first pressure;
   adjusting the pressure inside the chamber to a fourth pressure, wherein the fourth pressure is smaller than 30 Pa;
   adjusting the pressure inside the chamber to a second pressure, which is lower than the first pressure and higher than the forth pressure;
   aligning the first substrate with the second substrate, and placing the second substrate on the sealant, to form a closed space between the first substrate and the second substrate, the closed space having the second pressure;
   pumping the chamber from the second pressure to a third pressure, to bond the first substrate and the second substrate together by the pressure difference between the third pressure of the chamber and the second pressure of the closed space; and
   curing the sealant.

2. The assembly method for display panel according to claim 1, wherein after the pressure inside the chamber is adjusted to the fourth pressure, the method further comprises a step of waiting until the pressure inside the chamber is stable.

3. The assembly method for display panel according to claim 1, wherein after the pressure inside the chamber is adjusted to the second pressure, the method further comprises a step of waiting until the pressure inside the chamber is stable.

4. The assembly method for display panel according to claim 1, wherein the first pressure is about one atmospheric pressure.

5. The assembly method for display panel according to claim 1, wherein the second pressure is between 20 kPa and 50 kPa.

6. The assembly method for display panel according to claim 1, wherein the second pressure is between ¼ atmospheric pressure and ⅓ atmospheric pressure.

7. The assembly method for display panel according to claim 1, wherein the third pressure is larger than the first pressure.

8. The assembly method for display panel according to claim 1, wherein the third pressure is smaller than the first pressure.

9. The assembly method for display panel according to claim 1, wherein the third pressure is equal to the first pressure.

10. The assembly method for display panel according to claim 1, wherein the material of the sealant comprises an UV light setting resin, and the sealant is cured when exposed to UV light.

11. The assembly method for display panel according to claim 1, wherein the material of the sealant comprises a thermosetting resin, and the sealant is cured when heated.

12. The assembly method for display panel according to claim 1, wherein the first substrate comprises a silicon substrate and the second substrate comprises a glass substrate.

13. The assembly method for display panel according to claim 1, wherein the first substrate comprises a glass substrate and the second substrate comprises a silicon substrate.

* * * * *